United States Patent Office 2,990,384
Patented June 27, 1961

2,990,384
DEODORIZING OIL MODIFIED ALKYD-VINYL COPOLYMER SOLUTIONS
Alfred F. Schmutzler, Summit, N.J., assignor to France, Campbell & Darling, Incorporated, Kenilworth, N.J., a corporation of New Jersey
No Drawing. Filed July 16, 1956, Ser. No. 597,851
28 Claims. (Cl. 260—22)

This invention relates to esters of unsaturated fatty acids reacted with monomeric vinyl and diene compounds.

Esters of unsaturated fatty acids have been reacted with cyclopentadiene, styrene, and other monomeric diene and vinyl compounds to improve their drying properties and their hardness. Unfortunately, these reactions have never been complete. There has always remained some monomer which remained unreacted with the ester and caused a characteristic odor, a vinyl-polymerization odor. This odor seems to be a blend of monomer, dimer, and partial oxidation products of the monomer. It becomes unpleasant and even sickening after long exposures, as experienced by persons working with industrial finishes made with these resins.

It is one of the objects of this invention to eliminate or reduce considerably this vinyl-polymerization odor. Other objects will become apparent in the subsequent description.

The prior practice of reducing the intensity of the characteristic odor has been by sparging the hot ester solution with an inert gas. It has never been efficient, as the odors cannot be significantly reduced without evaporating all of the solvent. It is furthermore a bad practice, as it adds to the many already existing fire hazards of resin manufacturing.

My invention comprises the addition of an unsaturated aliphatic carboxylic acid compound to the reaction mixture after the bulk of the monomer and the ester have reacted. The roles of this unsaturated carboxylic compound seem to be the reduction of the partial oxidation products and the exhaustion of the unreacted monomer. Regardless of the principles involved, the discovery consists of a method of eliminating the characteristic polymerization odor by the addition of an unsaturated aliphatic carboxylic acid compound. This compound performs a scavenger service and reacts with free hydroxyl groups of the ester of a polyol and an unsaturated fatty acid.

During the latter reactions, there is an increase in the viscosity of the polyvinyl-alkyd resin solution. There is also an improvement in the drying properties and the hardness of the dry alkyd resin.

The unsaturated aliphatic carboxylic compound is a member selected from the group consisting of unsaturated aliphatic carboxylic acids, anhydrides of unsaturated aliphatic dicarboxylic acids, imides of unsaturated aliphatic dicarboxylic acids, acid alkyl esters of unsaturated aliphatic polycarboxylic acids, ammonium salts of unsaturated aliphatic carboxylic acids, amides of unsaturated aliphatic carboxylic acids, and amine salts of unsaturated aliphatic carboxylic acids.

The preferred scavenger for this reaction is maleic anhydride. Other polycarboxylic acid scavengers are fumaric acid, itaconic acid, and aconitic acid. Among these latter, the anhydrides are preferred whenever available.

In addition to the polycarboxylic acids, unsaturated monocarboxylic acids, such as alphacrotonic acid, sorbic acid and the like, can be used for eliminating the characteristic polymerization odor.

Examples of the acid esters of polycarboxylic acids are mono-alkyl ester of maleic acid, fumaric acid, itaconic acid, aconitic acid, the bis-alkyl esters of aconitic acid, and the like.

The vinylated esters that respond to the treatment of the unsaturated carboxylic acids and acid esters of the unsaturated polycarboxylic acids are those prepared with styrene, methyl styrene, vinyl-xylene, vinyl-pyridine, vinyl-phenol, vinyl-naphthalene, dicyclopentadiene, cyclopentadiene, vinyl-naphthol, vinyl chloride, vinyl acetate, isoprene, butylene, butadiene, and the like. With some of these monomers, such as butylene, dicyclopentadiene, cyclopentadiene, and acrylonitrile, and the like, the polymerization odor can only be reduced or eliminated after long reaction periods and with large additions of the unsaturated carboxylic acids, corresponding anhydrides and the esters of the polycarboxylic acids which have a free terminal carboxylic acid group.

The time required to reduce or eliminate the vinylpolymerization odors depends to some degree on the reactivity between the vinylation compound and the scavenger compound. Maleic anhydride, maleic acid, fumaric acid, itaconic acid, aconitic acid and the corresponding ammonium derivatives of these acids reduce the polymerization odors of styrene, vinyltoluene, vinylxylene in less than one hour, whereas a considerably longer time is required to reduce the odors of cyclopentadiene, vinylphenol, vinylpyridine, acrylonitrile, vinyl acetate, vinyl chloride, isoprene and the like. Conversely, the more polar monomers like vinyl phenol, vinyl acetate, acrylonitrile or the like, are more readily exhausted by the acid esters of the unsaturated polycarboxylic acids and the nitrogen derivatives of these polycarboxylic acids, such as maleamide, maleimide, the acid salt of trimethylammonium maleate, mono(triethylammonium) hydrogen maleate, mono(trimethylammonium) hydrogen fumarate, bis(trimethylammonium) hydrogen aconitate, mono(diethylammonium) hydrogen maleate, mono(methylammonium) hydrogen maleate, mono(morpholine) hydrogen maleate, mono(amylammonium) hydrogen itaconate, ammonium sorbate, amyl ammonium crotonate, and the like.

When the unsaturated acid, the anhydride, the acid ester of the unsaturated polycarboxylic acid, or the ammonium or amine salt of an unsaturated carboxylic acid is introduced into the mixture of ester, polyvinyl-ester, unreacted monomer and its partial oxidation products, it apparently combines with unreacted monomer and its partial oxidation products and retains its tendency to combine with any free or terminal hydroxyl groups of glycerine, glycol, pentaerythritol or the like. It thus can partake in alkyd resin formation. The acid anhydrides, the amides and imides are especially favored for this esterification to increase the size of the alkyd resin, which is accompanied by greater viscosity of the resin solution, faster drying properties, harder resin films, and improved chemical resistance. The acid alkyl esters, the acid ammonium and amine salts, and the acids add less slowly to free terminal hydroxyl groups than the anhydrides; they require a substantially longer reaction period. Though the results are slightly inferior to those of the anhydrides, they are still a vast improvement over the polyvinyl esters which have not undergone the treatment of reducing the intensity of the polymerization odor.

Some acids, such as crotonic acid, have their own characteristic odor which is imparted to the resulting product. That odor was eliminated by precipitating the unreacted acid with a metal, such as zinc, aluminum, their hydroxides, or the like, and with carbonates, such as calcium carbonate, barium carbonate, sodium carbonate, and similar reactive compounds which form an insoluble salt in the ester or in the solution of the ester.

Among the polyvinyl fatty acid esters that can be treated with maleic anhydride or similar compounds to reduce the vinyl polymerization odor are the esters comprising unsaturated fatty acids with polyhydric alcohols, such as ethylene glycol, propylene glycol, butylene glycol, pentanediol, pentenediol, hexylene glycol, hexenediol, hexanetriol, glycerol, pentaerythritol, dipentaerythritol, tripentaerythritol, sorbitol and the like.

Among the polyvinyl-alkyd resins that will respond to the same treatment are those comprising an unsaturated fatty acid, a polycarboxylic acid, and a polyhydric alcohol. Suitable polycarboxylic acids for such alkyd resins are phthalic anhydride, benzenetricarboxylic acid, naphthalenedicarboxylic acid, succinic acid, suberic acid, adipic acid, and the like.

The ratio of monomer to ester which is used in the preparation of the polyvinyl-ester can be between five percent and seventy percent; and the vinylation can be made with a monomer comprising vinyl chloride, vinyl acetate, allyl alcohol, allyl chloride, allyl acetate, styrene, methyl styrene, ethyl styrene, vinylxylene, vinylnaphthalene, vinyl pyridine, butene, butadiene, cyclopentadiene, dicyclopentadiene, isoprene, vinylphenol, vinylnaphthol, divinyl benzene, divinyl naphthalene, acrylonitrile, methyl acrylate, methyl methacrylate, ethyl acrylate, ethyl methacrylate, and the like. These monomers can have been used singly or in a combination. When such polyvinyl esters are reacted with maleic anhydride or a similar compound, the vinyl polymerization odor can be eliminated or greatly reduced.

The most useful vinylated esters are made from an alkyd resin and styrene, methyl styrene, divinyl benzene, dicyclopentadiene, and acrylonitrile. These products are the preferred polyvinyl-esters. Some of them will be demonstrated by examples, showing the preparation of the ester, the preparation of the polyvinyl-ester from the ester and a monomer, and the elimination or reduction of the polymerization odor. These examples are shown to demonstrate the invention, but they are not intended to limit the scope of the invention.

*Example 1*

In a suitable kettle, a dehydrated castor oil alkyd resin is prepared by reacting 148 parts of phthalic anhydride, 108 parts of soya oil fatty acids, 120 parts of castor oil, and 104 parts of 95% pure glycerine at 280° C. for about 4 hours or until a 50% solution of the alkyd resin in mineral spirits with a kauri-butanol value of about 37 has a viscosity of about 12 poises.

This alkyd resin is diluted with 580 parts of mineral spirits, 148 parts of styrene, and 12 parts of 2,2-bis-(tertiary-butylperoxy-)-butane, heated to the boiling temperature of the solvents and held at that temperature range of about 150 to 165° C. for about 8 hours, while the vapors of the solvents are condensed, separated from traces of condensed water, and returned to the hot solution. During this time, the temperature of the boiling solution rises from about 150° to about 165° C.; the viscosity of the solution changes from less than one poise to about 15 poises, and the non-volatile matter rises from 37.0% to 49.1%, where as the odor changes from that of pure styrene to that of a vinyl polymerization odor, a sweetish penetrating odor, which after long exposure becomes sickening.

A small portion of this polystyrene-alkyd resin solution was boiled for an additional 5 hours. After cooling, it had a viscosity of about 16 poises, with substantially the same solids content and with the same characteristic vinyl-polymerization odor.

*Example 2*

500 parts of polystyrene-alkyd resin solution, heated for 8 hours, of Example 1, was heated to 140° C. and nitrogen was bubbled through it at the rate of 50 parts by volume per minute. After 5 hours, 465 parts of the resin solution remained and its odor intensity was about 60% of the original odor, as determined by diluting a sample of Example 1 with mineral spirits with a KB (kauri-butanol value) of 37 until the odors were equal.

After passing nitrogen through the solution for 48 hours, about 340 parts of a very viscous resin solution remained and its odor intensity corresponded to about 40% of its original odor. The loss during this procedure amounted to about 160 parts of solvent.

*Example 3*

500 parts of polystyrene-alkyd resin solution of Example 1 and 2 parts of maleic anhydride were heated in a suitable kettle so that its solvents boiled for 5 hours while the vapors were condensed and the condensed solvents were separated from condensed moisture and returned to the boiling solution. After cooling, the resulting 502 parts of resin solution had lost its characteristic polymerization odor and the remaining odor was that of mineral spirits. The non-volatile matter was 49.45%, which is very close to 100% polymerization of all styrene introduced in Example 1, whereas the polymerization in Example 1 had stopped at about 95%. The viscosity had changed from about 16 poises to about 30 poises. An additional change was noticed in the rate of drying: a 3 mil wet film of this resin solution containing cobalt naphthenate as 0.03% cobalt and lead naphthenate as 0.02% lead, based on the non-volatile resin, dried in about 75% of the time required for the drying of the resins of Examples 1 and 2 with the same amount of driers at substantially the same resin concentration as the solution of Example 3. The dry resin film of Example 3 was harder and tougher and had better solvent resistance than those of Examples 1 and 2.

*Example 4*

The dehydrated castor oil alkyd resin of Example 1 was prepared again. After reacting the resin until a 50% solution of the sample had a viscosity of 10.5 poises, it was dissolved in 788 parts of mineral spirits, 355 parts of styrene, and 16 parts of 2,2-bis-(tertiary-butylperoxy-)-butane.

The resulting solution was heated at the boiling point of the solvents whose vapors were condensed and continuously returned to the solution while they were separated from condensed moisture, for 8 hours and then cooled. During this time the temperature of the solution rose from about 145° C. to about 170° C., the viscosity changed from less than one poise to about 6 poises, and the non-volatile matter increased from 27.2% to 49.1%, whereas the odor changed from that of styrene to that of a styrene-polymerization odor, a sweetish, penetrating aroma, which after long exposure became sickening. A small portion of this resin solution was boiled for 12 hours more. After cooling, the resulting resin solution had a viscosity of about 6.5 poises, the non-volatile matter was still 49.1% and the solution had retained the characteristic odor.

*Example 5*

500 parts of polystyrene-alkyd resin solution of Example 4 and 3 parts of maleic anhydride were heated at the boiling point of its solvents, while the vapors were condensed and the condensed solvent separated from condensed moisture and returned to the boiling solution. After 6 hours, the resulting 503 parts of resin solution had lost its characteristic polymerization odor and the remaining odor was that of mineral spirits, the non-volatile matter had increased to 49.6%, which is substantially a 100% polymerization of the styrene, whereas the polymerization in Example 4 had stopped at 97%. The viscosity changed from 6 poises to about 36 poises. There was a considerable improvement in the drying rate of the resin: a 3 mil wet film of the resin solution of Example 5 with the proper amount of catalysts dried in about 60% of the time required for the resin solution of Example 4 with the same amount of drier. The dry film of Example 5 was harder and more solvent resistant than that of Example 4.

Example 6

500 parts of polystyrene-alkyd resin solution and 3 parts of itaconic acid were heated in a suitable kettle so that its solvents boiled for 16 hours, while the vapors were condensed, the condensed solvents separated from condensed moisture and returned to the boiling solution. After cooling, the resulting 502½ parts of resin solution had lost its characteristic polymerization odor and the remaining odor was that of mineral spirits. The non-volatile matter was 49.6%, which is substantially a 100% polymerization, whereas the polymerization of the styrene in Example 4 had stopped at 97%.

Example 7

In a suitable kettle, a dehydrated castor oil alkyd resin was prepared by reacting 148 parts of phthalic anhydride, 300 parts of castor oil, and 86½ parts of 95% glycerine at 280° C. until the viscosity of a 60% solution in mineral spirits was 23 poises. Then the alkyd resin was dissolved in 655 parts of mineral spirits with a KB of 45, 164 parts of styrene, and 13 parts of 2,2-bis-(tertiary-butylperoxy-)-butane. The solution was heated for 8 hours at the boiling temperature of the solvents, while the vapors were condensed, the condensed solvent separated from condensed moisture, and returned to the boiling solution. During this time, the viscosity changed from less than 2 poises to about 13 poises and the non-volatile matter increased from 37.1% to 49.2%, whereas the styrene odor changed to the characteristic styrene-polymerization odor.

If the resin solution is heated for an additional 16 hours at the boiling temperature of its solvent, the non-volatile matter remains at 49.2% and the viscosity increases to about 14 poises.

Example 8

200 parts of polystyrene-alkyd resin solution of Example 7 and 1 part of crotonic acid were heated for 16 hours so that its solvent boiled while the vapors were condensed and the condensed solvent was separated from condensed moisture and returned to the boiling solution. After cooling, the resulting 201 parts of resin solution had lost its characteristic styrene-polymerization odor. The non-volatile matter had increased to 49.7%, and the viscosity increased to about 22 poises.

There remained a slight odor of crotonic acid. These traces could be removed by suspending powdered chalk in the hot resin solution and filtering the suspension.

Example 9

200 parts of polystyrene-alkyd resin solution and 1 part of aconitic acid were heated for 16 hours so that its solvent boiled while the vapors were condensed and the condensed solvent was separated from condensed moisture and returned to the boiling solution. After cooling, the resulting 201 parts of resin solution had lost its characteristic styrene-polymerization odor. The non-volatile matter had increased to 49.7% and the viscosity had increased to 27 poises.

Example 10

200 parts of polystyrene-alkyd resin solution and 1 part of sorbic acid were heated for 16 hours so that its solvent boiled while the vapors were condensed and the condensed solvent was separated from condensed moisture and returned to the boiling solution. After cooling, the resulting 201 parts of resin solution had lost its characteristic styrene-polymerization odor. The non-volatile matter had increased to 49.7% and the viscosity had increased to about 23 poises.

Example 11

200 parts of polystyrene-alkyd resin solution and 1 part of monomethyl ester of maleic acid were heated for 16 hours so that its solvent boiled while the vapors were condensed and the condensed solvent was separated from condensed moisture and returned to the boiling solution. After cooling, the resulting 201 parts of resin solution had lost its characteristic styrene-polymerization odor. The non-volatile matter had increased to 49.7% and viscosity had increased to about 26 poises.

Example 12

100 parts of polystyrene-alkyd resin solution and 1 part of the acid amyl ester of aconitic acid were heated for 16 hours so that its solvent boiled while the vapors were condensed and the condensed solvent was separated from condensed moisture and returned to the boiling solution. After cooling, the resulting 101 parts of resin solution had lost its characteristic styrene-polymerization odor. The non-volatile matter had increased to 49.7% and the viscosity had increased to about 18 poises.

Example 13

100 parts of polystyrene-alkyd resin solution and 1 part of the acid ester of itaconic acid and butylene glycol were heated for 16 hours so that its solvent boiled while the vapors were condensed and the condensed solvent was separated from condensed moisture and returned to the boiling solution. After cooling, the resulting 101 parts of resin solution had lost its characteristic styrene-polymerization odor. The non-volatile matter had increased to 49.8% and the viscosity had increased to about 22 poises.

Example 14

100 parts of polystyrene-alkyd resin solution and 1 part of ammonium sorbate were heated for 16 hours so that its solvent boiled while the vapors were condensed and the condensed solvent was separated from condensed moisture and returned to the boiling solution. After cooling, the resulting 101 parts of resin solution had lost its characteristic styrene-polymerization odor. The non-volatile matter had increased to 49.7% and the viscosity had increased to about 22 poises.

Example 15

100 parts of polystyrene-alkyd resin solution and 1 part of amylammonium crotonate were heated for 16 hours so that its solvent boiled while the vapors were condensed and the condensed solvent was separated from condensed moisture and returned to the boiling solution. After cooling, the resulting 101 parts of resin solution had lost its characteristic styrene-polymerization odor. The non-volatile matter had increased to 49.7% and the viscosity had increased to about 26 poises.

Example 16

100 parts of polystyrene-alkyd resin solution and 1 part of tris(triethylammonium) aconitate were heated for 16 hours so that its solvent boiled while the vapors were condensed and the condensed solvent was separated from condensed moisture and returned to the boiling solution. After cooling, the resulting 100.1 parts of resin solution had lost its characteristic styrene-polymerization odor. The non-volatile matter had increased to 49.7% and the viscosity had increased to about 28 poises.

Example 17

100 parts of polystyrene-alkyd resin solution and 1 part of itaconic acid were heated for 16 hours so that its solvent boiled while the vapors were condensed and the condensed solvent was separated from condensed moisture and returned to the boiling solution. After cooling, the resulting 100.5 parts of resin solution had lost its characteristic styrene-polymerization odor. The non-volatile matter had increased to 49.7% and the viscosity had increased to about 30 poises.

Example 18

100 parts of polystyrene-alkyd resin solution and 1 part of maleimide were heated for 16 hours so that its solvent boiled while the vapors were condensed and the condensed solvent was separated from condensed moisture and returned to the boiling solution. After cooling, the resulting 101 parts of resin solution had lost its characteristic styrene-polymerization odor. The non-volatile matter had increased to about 49.7% and the viscosity had increased to about 50 poises.

*Example 19*

In a suitable kettle, a soybean oil alkyd resin was prepared by reacting 296 parts of phthalic anhydride, 442 parts of soybean oil fatty acid, and 198 parts of 95% glycerine at 250° C. in an inert atmosphere until a 60% solution of the alkyd in a mineral spirits with a KB of 37 had a viscosity of about 11 poises. This resin was dissolved in 1915 parts of mineral spirits with a KB of 37, and the solution was heated so that its solvent boiled while the vapors were condensed and the condensed solvent separated from condensed moisture and returned to the boiling solution. To this boiling solution, there was gradually added a mixture of 480 parts of styrene and 38 parts of 2.2-bis(tertiary-butylperoxy-) butane over a period of one hour. After this addition, the mixture was heated for an additional 6 hours. After 6 hours the viscosity had increased from less than 2 poises to about 13 poises, and the solids content increased from 44.4% to 57.8%. If the resin is boiled an additional 24 hours, the viscosity will increase to Y and the solids content to 58.1%. The odor will remain the characteristic styrene-polymerization odor.

*Example 20*

150 parts of polystyrene-alkyd resin of Example 19 and 1 part of maleic anhydride were heated for 5 hours so that its solvent boiled while the vapors were condensed and the condensed solvent was separated from condensed moisture and returned to the boiling solution. After cooling, the resulting 151 parts of resin solution had lost its characteristic styrene-polymerization odor. The non-volatile matter had increased to 59%, and the viscosity had increased to about 50 poises.

*Example 21*

75 parts of polystyrene-alkyd resin of Example 19 and 1 part of bis(butylammonium) fumarate were heated for 5 hours so that its solvent boiled while the vapors were condensed and the condensed solvent was separated from condensed moisture and returned to the boiling solution. After cooling, the resulting 76 parts of resin solution had lost its characteristic styrene-polymerization odor. The non-volatile matter had increased to 59.3%, and the viscosity had increased to about 25 poises.

*Example 22*

150 parts of polystyrene-alkyd resin of Example 19 and 1 part of maleimide were heated for 5 hours so that its solvent boiled while the vapors were condensed and the condensed solvent was separated from condensed moisture and returned to the boiling solution. After cooling, the resulting 151 parts of resin solution had lost its characteristic styrene-polymerization odor. The non-volatile matter had increased to 59.1%, and the viscosity had increased to about 55 poises.

*Example 23*

150 parts of polystyrene-alkyd resin and 1 part of the amide of itaconic acid were heated for 5 hours so that its solvent boiled while the vapors were condensed and the condensed solvent was separated from condensed moisture and returned to the boiling solution. After cooling the resulting 151 parts of resin solution had lost its characteristic styrene-polymerization odor. The non-volatile matter had increased to 59.0%, and the viscosity had increased to about 35 poises.

*Example 24*

150 parts of polystyrene-alkyd resin and 1 part of ammonium sorbate were heated for 5 hours so that its solvent boiled while the vapors were condensed and the condensed solvent was separated from condensed moisture and returned to the boiling solution. After cooling the resulting 151 parts of resin solution had lost its characteristic styrene-polymerization odor. The non-volatile matter had increased to 59.2%, and the viscosity had increased to about 25 poises.

*Example 25*

150 parts of polystyrene-alkyd resin and 1 part of ammonium fumarate were heated for 5 hours so that its solvent boiled while the vapors were condensed and the condensed solvent was separated from condensed moisture and returned to the boiling solution. After cooling the resulting 151 parts of resin solution had lost its characteristic styrene-polymerization odor. The non-volatile matter had increased to 59.3%, and the viscosity had increased to about 60 poises.

*Example 26*

In a suitable kettle, 1700 parts of crude tall oil and 100 parts of maleic anhydride were heated at about 280° C. for 2 hours, and then cooled to 150° C., when 240 parts of glycerol and 50 parts of mineral spirits were added. The mixture was heated again at 280° C. until the acid number was about 10. Then, 400 parts of P-1 Ink Oil, a petroleum hydrocarbon, boiling between 460 and 530° F., were added, and the solution was cooled to 200° C. Without further cooling, a mixture of 120 parts of acrylonitrile, 10 parts of carbitol, 10 parts of acetone and 10 parts of cumene hydroperoxide were added slowly enough so that there was just a slight rate of distillation, during which the condensed vapors of acrylonitrile and hydrocarbon were separated from any liberated water and returned to the resin solution. After the addition was completed, the solution was heated for 4 hours more. During this time the solvents boiled, but the condensate was returned to the solution.

Then, 1000 parts of P-1 Ink Oil was added. The resulting solution of acrylonitrile-modified tall oil alkyd had a solids content of 57.1%, a viscosity of about 8 poises, and a strong odor of acrylonitrile.

If this solution is boiled for an additional 16 hours, the solids content increases to 57.3% and the viscosity increases to about 10 poises.

*Example 27*

In a suitable kettle, 1000 parts of vinylated alkyd resin of Example 26, with a viscosity of about 8 poises, and 12 parts of the acid mono-(diethyl) amide of maleic acid, made by reacting equimolar proportions of diethylamine and maleic anhydride, were mixed and heated so that its solvents boiled, while the solvent vapors were condensed, separated from water and returned to the boiling solution.

After 16 hours, there remained substantially no free acrylonitrile, as noticed by the absence of odor of acrylonitrile, as noticed by the absence of odor of acrylonitrile. The viscosity had increased to about 60 poises and the solids content was about 58.1%.

*Example 28*

In a suitable kettle, 195 parts of sorbitol, 1530 parts of refined tall oil and 81 parts of mineral spirits were heated at about 274° C., while the liberated water formed was promptly removed from the resulting ester solution, until the acid number of the reaction mixture was about 13. Then 1270 parts of P-1 Ink Oil, a high boiling hydrocarbon, was added and to the resulting solution, a mixture of 50 parts of acrylonitrile, 300 parts of styrene, 3 parts of acetaldehyde, and 3 parts of ditertiary-butyl peroxide was slowly added so that all vapors could be condensed and, after traces of water were separated from the condensate, returned to the boiling solution. The resulting vinylated tall oil ester had a viscosity of about 3 poises. It had a strong vinyl polymerization odor, with an overtone of acrylonitrile.

If this resin solution were boiled for an additional 16 hours, the viscosity was raised to about 4 poises, however the same characteristic odor remained.

Example 29

In a suitable kettle, 1000 parts of vinylated tall oil ester of Examples 28, and 10 parts of the acid ethyl ester of maleic acid were mixed and the resulting solution was heated so that its solvents boiled while being condensed, separated from any water, and returned to the boiling solution.

After 16 hours of boiling, the vinyl polymerization odor had disappeared and the viscosity had increased to about 15 poises.

Example 30

A dehydrated alkyd resin was prepared from 187 parts of castor oil, 268 parts of phthalic anhydride, 584 parts of soybean oil fatty acids, 56 parts of neopentyl glycol, and 157 parts of pentaerythritol. The charge was heated at 260° C. until the resin had an acid number of 8. Then it was dissolved in 1000 parts of vinyltoluene, 70 parts of acrylonitrile, and 22 parts of tertiarybutyl peroxide, and 1560 parts of xylene. The solution was heated so that its solvents boiled while the vapors were condensed, the condensed solvents separated from condensed moisture and returned to the boiling resin solution. After 10 hours of boiling, the viscosity was about 26 poises and the solids content was 59.5%. The odor of acrylonitrile predominated the vinyl polymerization odor.

If the vinylated ester solution is boiled for an additional 16 hours, the viscosity increased to about 30 poises and the solids contents increased to 59.8%.

Example 31

300 parts of vinylated alkyd ester solution of Example 30 and 3 parts of triethylammonium hydrogen maleate were heated so that its solvent boiled while the vapors were condensed, the condensed solvents separated from condensed moisture and returned to the boiling resin solution. After 16 hours of boiling, the viscosity had increased to about 45 poises; the solids content had increased to about 62%, and the odor of the vinylated alkyd ester solution was predominantly that of xylene.

Example 32

300 parts of vinylated alkyd ester solution of Example 30 and 3 parts of maleic anhydride were heated so that its solvents boiled while the vapors were condensed, the condensed solvents were separated from condensed moisture and returned to the boiling resin solution. After 16 hours of boiling, the viscosity had increased to about 40 poises, the solids content had increased to about 62% and the odor of the solution was predominantly that of xylene.

Example 33

300 parts of vinylated alkyd ester solution of Example 30 and 3 parts of acid ester of maleic anhydride and propylene glycol were heated so that its solvents boiled while the vapors were condensed, the condensed solvents were separated from condensed moisture and returned to the boiling resin solution. After 16 hours of boiling, the viscosity had increased to about 35 poises, the solids content had increased to about 62%, and the odor of the solution was predominantly that of xylene.

The type of drying oil fatty acid ester has no effect on the improvement of the odor by further reacting with the unsaturated aliphatic carboxylic compound. However, in choosing an ester for such a purpose it is customary to choose a fatty acid with some degree of unsaturation. Such suitable acids can be obtained from drying oils, or by-products from paper manufacture, or can be prepared synthetically, such as sorbic acid or long chain aliphatic acids with some degree of unsaturation as obtained in the Fischer-Tropsch process. If such acids are reacted with glycerine or pentaerythritol, they yield products resembling oils or fats. Consequently, they can be classified as unsaturated fatty acids.

Concentration of the copolymer has very little effect on the scavenging action of the carboxylic compound required. However, the time of reaction for the complete elimination of the polymerization odor is slightly longer with very dilute polyvinyl-drying oil esters than with the same ester without any solvent.

The nature of the solvent, as long as it is not reactive with the scavenger compound, has apparently no affect on the scavenging action.

The inert solvents comprise aliphatic hydrocarbons, such as mineral spirits and kerosene fractions with low kauri-butanol values, and aromatic hydrocarbons, such as benzene, toluene, xylene, and mineral spirits and kerosene fractions of high kauri-butanol values. These solvents are the more suitable. Other suitable solvents are terpenes, such as turpentine, terpineol, etc.

The amount of the carboxylic compound can vary over a very wide range, depending upon many factors but important is the proportion of monomer remaining unreacted. If the reaction or polymerization of the monomer is almost complete, as little as 1 part per 10,000 parts of vinylated ester is sufficient, whereas in more incomplete polymerizations, as much as 250 parts per 10,000 parts will be necessary for the complete removal of the odor. Smaller amounts are sufficient to reduce the odor substantially.

The larger the amount of carboxylic compound, the faster will be the reduction or elimination of the polymerization odor.

The time of reaction may vary from 10 minutes to 20 hours after the addition of the carboxylic compound.

The unsaturated aliphatic carboxylic compound may be a member selected from the group consisting of carboxylic acids, anhydrides of dicarboxylic acids, imides of dicarboxylic acids, acid esters of polycarboxylic acids, ammonium salts, amine salts and amides such as amides of maleic, fumaric, itaconic, crotonic, acrylic and methacrylic acids.

It was found that the incorporation of the unsaturated aliphatic carboxylic compound to a vinylated resin comprising a monomeric vinyl compound and a fatty acid ester eliminated or greatly reduced the vinyl polymerization odor, increased the viscosity of the resulting resin solution, improved the drying rate of surface coatings made with these improved resin solutions, and in the hardened film of surface coatings improved at least one of the following and in many instances all of the following:

(1) Water resistance
(2) Acid resistance
(3) Soap and alkali resistance
(4) Solvent resistance
(5) Toughness
(6) Hardness The improved vinylated esters of this invention are therefore superior vehicles for the preparation of pigmented industrial finishes.

While the invention has been illustrated by certain examples, they are not to be construed as limiting and it is intended to cover all such modifications and embodiments as fall within the spirit and scope of the appended claims.

I claim:

1. The process of improving the order of an inert solvent solution of a previously formed copolymer of a vinyl compound and an unsaturated fatty acid-modified alkyd resin comprising adding to said solution of said copolymer a deodorizing amount of an unsaturated aliphatic carboxylic compound, said compound being a member selected from the group consisting of unsaturated aliphatic carboxylic acids, anhydrides of unsaturated aliphatic dicarboxylic acids, imides of unsaturated aliphatic dicarboxylic acids, said alkyl esters of unsaturated aliphatic polycarboxylic acids, ammonium salts of unsaturated aliphatic carboxylic acids, amides of unsaturated aliphatic carboxylic acids, and amine salts of unsaturated aliphatic carboxylic acids, and heating said mixture until the vinyl polymerization odor is substantially lessened.

2. The process set forth in claim 1 wherein 0.01–2.5% of said unsaturated aliphatic carboxylic compound by weight of said copolymer is added.

3. The process set forth in claim 1 wherein said vinyl compound is styrene.

4. The process set forth in claim 1 wherein said unsaturated aliphatic carboxylic compound is maleic anhydried.

5. The process set forth in claim 1 wherein said unsaturated aliphatic carboxylic compound is aconitic acid.

6. The process set forth in claim 1 wherein said unsaturated aliphatic carboxylic compound is maleic acid.

7. The process set forth in claim 1 wherein said unsaturated aliphatic carboxylic compound is fumaric acid.

8. The process set forth in claim 1 wherein said unsaturated aliphatic carboxylic compound is an unsaturated aliphatic dicarboxylic acid.

9. The process set forth in claim 1 wherein said unsaturated aliphatic carboxylic compound is an amide of an unsaturated aliphatic dicarboxylic acid.

10. The proces set forth in claim 1 wherein said unsaturated aliphatic carboxylic compound is an acid alkyl ester of an unsaturated aliphatic dicarboxylic acid.

11. The process set forth in claim 1 wherein said unsaturated aliphatic carboxylic compound is an unsaturated aliphatic tricarboxylic acid.

12. The process set forth in claim 1 wherein said unsaturated aliphatic carboxylic compound is an unsaturated aliphatic monocarboxylic acid.

13. The process set forth in claim 1 wherein said unsaturated aliphatic carboxylic compound is the monoammonium salt of an unsaturated aliphatic dicarboxylic acid.

14. The process set forth in claim 1 wherein said unsaturated aliphatic carboxylic compound is a mono-amine salt of an unsaturated aliphatic dicarboxylic acid.

15. The composition formed by the process of claim 1.
16. The composition formed by the process of claim 2.
17. The composition formed by the process of claim 3.
18. The composition formed by the process of claim 4.
19. The composition formed by the process of claim 5.
20. The composition formed by the process of claim 6.
21. The composition formed by the process of claim 7.
22. The composition formed by the process of claim 8.
23. The composition formed by the process of claim 9.
24. The composition formed by the process of claim 10.
25. The composition formed by the process of claim 11.
26. The composition formed by the process of claim 12.
27. The composition formed by the process of claim 13.
28. The composition formed by the process of claim 14.

References Cited in the file of this patent

UNITED STATES PATENTS

| | | |
|---|---|---|
| 1,975,959 | Lawson | Oct. 9, 1934 |
| 2,361,019 | Gerhart | Oct. 24, 1944 |
| 2,561,313 | Malinowski | July 17, 1951 |
| 2,646,416 | Parker | July 21, 1953 |
| 2,661,347 | Wesp et al. | Dec. 1, 1953 |

UNITED STATES PATENT OFFICE
CERTIFICATE OF CORRECTION

Patent No. 2,990,384                June 27, 1961

Alfred F. Schmutzler

It is hereby certified that error appears in the above numbered patent requiring correction and that the said Letters Patent should read as corrected below.

Column 10, line 69, for "order" read -- odor --; column 11, lines 16 and 17, for "anhydried" read -- anhydride --.

Signed and sealed this 28th day of November 1961.

(SEAL)

Attest:

ERNEST W. SWIDER                      DAVID L. LADD

Attesting Officer                     Commissioner of Patents

USCOMM-DC